United States Patent
Zhong (10) Patent No.: US 12,420,698 B2
(45) Date of Patent: Sep. 23, 2025

(54) LARGE-TRAVEL ANTI-LOOSENING CARGO BAR CAPABLE OF CLOUD MONITORING

(71) Applicant: Changzhou Anicar Cargo Control Co., Ltd., Jiangsu (CN)

(72) Inventor: Jielian Zhong, Jiangsu (CN)

(73) Assignee: Changzhou Anicar Cargo Control Co., Ltd, Changzhou (CN)

( * ) Notice: Subject to any disclaimer, the term of this patent is extended or adjusted under 35 U.S.C. 154(b) by 530 days.

(21) Appl. No.: 17/944,349

(22) Filed: Sep. 14, 2022

(65) Prior Publication Data

US 2023/0356646 A1 Nov. 9, 2023

(30) Foreign Application Priority Data

May 6, 2022 (CN) .......................... 202210484836.8

(51) Int. Cl.
*B60P 7/15* (2006.01)
*H04B 1/02* (2006.01)

(52) U.S. Cl.
CPC . *B60P 7/15* (2013.01); *H04B 1/02* (2013.01)

(58) Field of Classification Search
CPC ................................... B60P 7/15; H04B 1/02
USPC ........................................................ 410/143
See application file for complete search history.

(56) References Cited

U.S. PATENT DOCUMENTS

| | | | | |
|---|---|---|---|---|
| 6,062,782 A | * | 5/2000 | Huang | B60P 7/15 410/151 |
| 6,247,882 B1 | * | 6/2001 | Huang | B60P 7/15 410/151 |
| 8,191,864 B2 | * | 6/2012 | Ruan | B66F 1/06 254/95 |
| 9,481,286 B1 | * | 11/2016 | Xiao | B60P 7/15 |

FOREIGN PATENT DOCUMENTS

| CA | 2576468 C | * | 1/2012 | ............... B60P 7/15 |
|---|---|---|---|---|
| DE | 102016015047 A1 | * | 6/2018 | ............... B60P 7/15 |

* cited by examiner

*Primary Examiner* — Daniel J Colilla
*Assistant Examiner* — Philip Charles Adams (57) ABSTRACT

Disclosed is a large-travel anti-loosening Cargo Bar capable of cloud monitoring, and relates to the technical field of means of transport. The large-travel anti-loosening Cargo Bar capable of cloud monitoring comprises a Cargo Bar main body, a first bearing assembly and a trigger assembly, wherein the first bearing assembly is slidably connected with the Cargo Bar main body; the trigger assembly is arranged in the first bearing assembly, and the trigger assembly comprises a signal transmitter, an induction contact and an elastic piece; the signal transmitter is fixedly connected with the first bearing assembly; the induction contact is in sliding connection with the first bearing assembly and is fixedly connected with the fixer main body; the elastic piece is located between the signal transmitter and the induction contact.

6 Claims, 7 Drawing Sheets

LARGE-TRAVEL ANTI-LOOSENING CARGO BAR CAPABLE OF CLOUD MONITORING

CROSS REFERENCE TO RELATED APPLICATION

This patent application claims the benefit of and takes priority from Chinese Patent Application No. 202210484836.8, filed on May 6, 2022, the disclosure of which is incorporated by reference herein in its entirety as part of the present application.

TECHNICAL FIELD

The present disclosure relates to the technical field of means of transport, and more specifically relates to a large-travel anti-loosening Cargo Bar capable of cloud monitoring.

BACKGROUND ART

During cargo transportation of a vehicle, cargos are prone to rolling or vibrating due to uneven roads or emergency brakes in the transportation process, so that great potential safety hazards exist in the transportation process.

Therefore, a Cargo Bar is provided. However, in the driving process of an existing Cargo Bar, a driver cannot check whether the Cargo Bar is loosened or not and whether the Cargo Bar is in a working state or not in a cab, and corresponding measures cannot be taken on the Cargo Bar, so that safety accidents are likely to be caused.

Thus, how to provide a Cargo Bar capable of preventing loosening and monitoring the working state is a problem urgently to be solved by those skilled in the art.

SUMMARY

Therefore, the present disclosure provides a large-travel anti-loosening Cargo Bar capable of cloud monitoring, aims to solve the problems in the background art, and realizes remote monitoring of the working state of the Cargo Bar.

In order to achieve the above purpose, the present disclosure adopts the following technical scheme.

A large-travel anti-loosening Cargo Bar capable of cloud monitoring comprises:
 a Cargo Bar main body;
 a first bearing assembly, the first bearing assembly being slidably connected with the Cargo Bar main body;
 a trigger assembly, the trigger assembly being arranged in the first bearing assembly, and the trigger assembly comprising a signal transmitter, an induction contact and an elastic piece;
 the signal transmitter being fixedly connected with the first bearing assembly;
 the induction contact being in sliding connection with the first bearing assembly and being fixedly connected with the Cargo Bar main body;
 the elastic piece being located between the signal transmitter and the induction contact;
 wherein, when the Cargo Bar is in a working state, the signal transmitter is in contact with the induction contact, the signal transmitter is in communication connection with an external terminal, and the terminal is used for monitoring the working state of the Cargo Bar.

Further, the Cargo Bar main body comprises an inner pipe, an outer pipe, a connecting mechanism and a second bearing assembly; and
 one end of the inner pipe extends into the outer pipe, the inner pipe is slidably connected with the outer pipe, the first bearing assembly is slidably connected with the end, away from the outer pipe, of the inner pipe, the second bearing assembly is fixedly connected with the end, away from the inner pipe, of the outer pipe, and the connecting mechanism is used for connecting the inner pipe and the outer pipe.

Further, the connecting mechanism comprises a fixed support and a clamping assembly;
 the fixed support is fixedly connected with the end, away from the second bearing assembly, of the outer pipe;
 the clamping assembly comprises a supporting piece and a clamping piece;
 the supporting piece is connected with the fixed support through a locking assembly; and
 the clamping piece is rotatably connected with the supporting piece, a plurality of spacing holes is formed in the inner pipe in the length direction of the inner pipe at intervals, and protrusions matched with the spacing holes are arranged on the clamping piece.

Further, a stop boss is arranged on the inner wall of the fixed support and used for axially limiting the end of the outer pipe.

Further, the large-travel anti-loosening Cargo Bar capable of cloud monitoring further comprises a fixed part, the fixed part sleeves the inner pipe, and the fixed part is connected with the supporting piece.

Further, the locking assembly comprises a handle, a rack, and a lock pin;
 one end of the handle is rotatably connected with the fixed support, and a ratchet wheel is arranged at the end, connected with the fixed support, of the handle;
 one end of the rack is connected with the supporting piece, the other end of the rack extends towards the direction of the outer pipe, and the rack is matched with the ratchet wheel; and
 the lock pin is arranged in the middle of the handle, and a pin hole matched with the lock pin is formed in the fixed support;
 wherein, when the lock pin is clamped in the pin hole, the ratchet wheel is meshed with the rack.

Further, the end, matched with the pin hole, of the lock pin is provided with a limiting step, a spring sleeves the lock pin located between the handle and the limiting step, the pin hole is of a pear-shaped structure, the lock pin can pass through the lower portion of the pin hole, and the limiting step can be connected to the upper portion of the pin hole in a clamped mode.

Further, the first bearing assembly comprises a first bearing plate, a first connecting pipe and a first non-slip mat, one end of the first connecting pipe is connected with the first bearing plate, a strip-shaped hole is formed in the first connecting pipe, the other end of the first connecting pipe is slidably connected with the inner pipe through the strip-shaped hole, and the first non-slip mat is arranged at the end, away from the first connecting pipe, of the first bearing plate.

Further, the second bearing assembly comprises a second bearing plate, a second connecting pipe and a second non-slip mat, one end of the second connecting pipe is fixedly connected with the second bearing plate, the other end of the second connecting pipe is fixedly connected with the outer pipe, and the second non-slip mat is arranged at the end, away from the second connecting pipe, of the second bearing plate.

Further, the elastic piece is a reset spring.

According to the technical scheme, compared with the prior art, the present disclosure provides a large-travel anti-loosening Cargo Bar capable of cloud monitoring. The trigger assembly is arranged in the first bearing assembly. In the using process, under the condition that the two ends of the Cargo Bar are stressed, the signal transmitter makes contact with the induction contact, and therefore the working state of the Cargo Bar can be monitored through the terminal. When the Cargo Bar is loosened, the signal transmitter is disconnected from the induction contact, the terminal can monitor that the Cargo Bar is in a non-working state, the Cargo Bar is loosened, and then a driver is reminded of taking corresponding measures. Therefore, the working state of the Cargo Bar can be remotely monitored, and safety accidents are prevented.

BRIEF DESCRIPTION OF THE DRAWINGS

In order to illustrate the technical scheme in the embodiment of the present disclosure or in the prior art more clearly, the attached figures needing to be used in the embodiment or in the description in the prior art are simply described. Apparently, the embodiments in the following description are merely a part rather than all of the embodiments of the present disclosure. For any person skilled in the art, under the premise of without contributing creative labor, other attached figures further can be obtained according to these attached figures.

Reference signs: 1, first bearing assembly; 101, first bearing plate; 102, first connecting pipe; 103, first non-slip mat; 2, trigger assembly; 201, signal transmitter; 202, induction contact; 203, elastic piece; 3, inner pipe; 4, outer pipe; 5, connecting mechanism; 51, fixed support; 52, clamping assembly; 521, supporting piece; 522, clamping piece; 6, second bearing assembly; 61, second bearing plate; 62, second connecting pipe; 63, second non-slip mat; 7, stop boss; 8, fixed part; 9, locking assembly; 91, handle; 92, rack; 93, lock pin; 10, spacing hole; 11, protrusion; 12, ratchet wheel; 13, pin hole; 14, limiting step; 15, strip-shaped hole; and 36, a Cargo Bar main body.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

Figure 1:
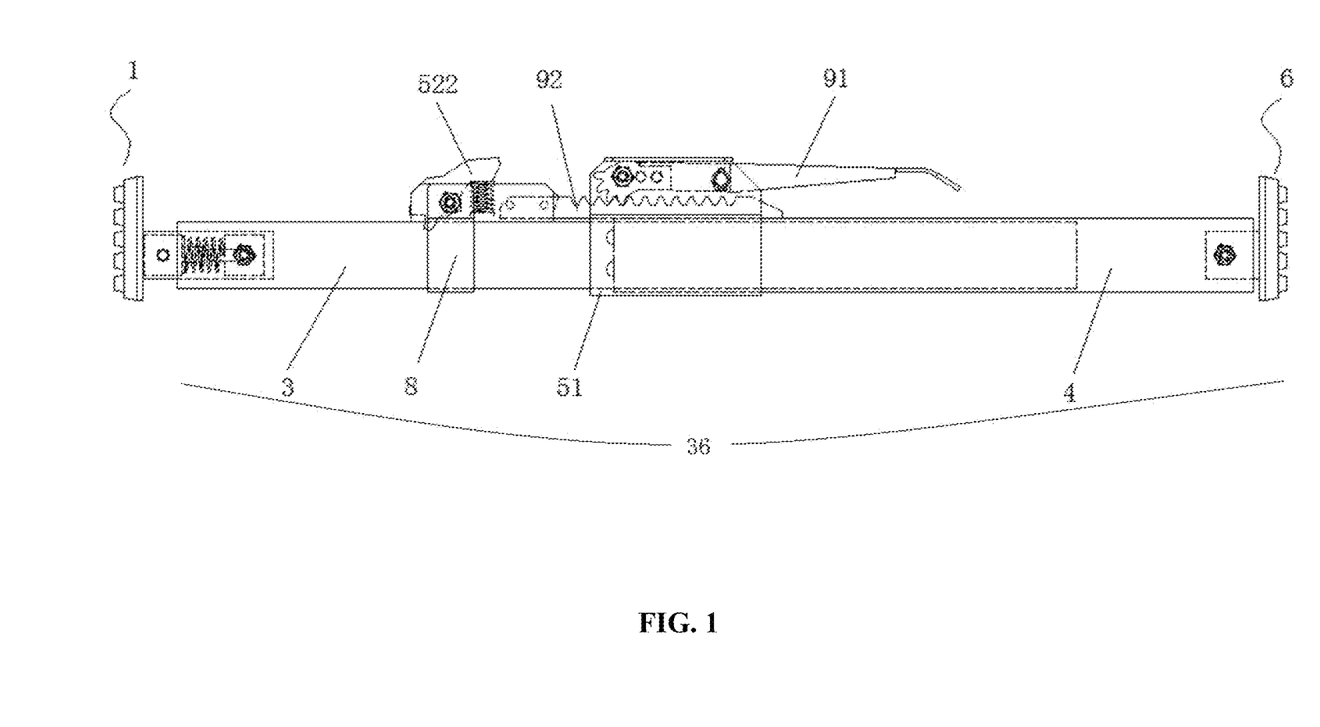
FIG. 1 is a front view of a large-travel anti-loosening Cargo Bar capable of cloud monitoring provided by the present disclosure.
Figure 2:
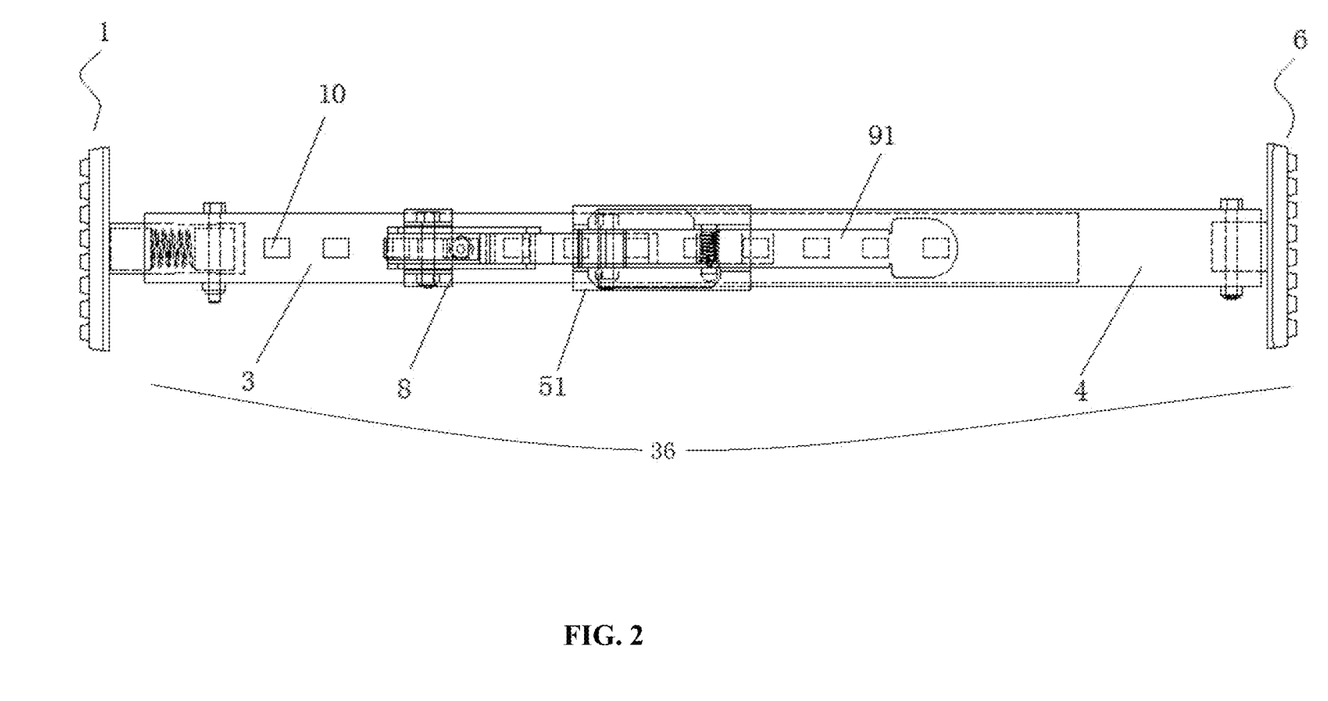
FIG. 2 is a top view of a large-travel anti-loosening Cargo Bar capable of cloud monitoring provided by the present disclosure.
Figure 3:
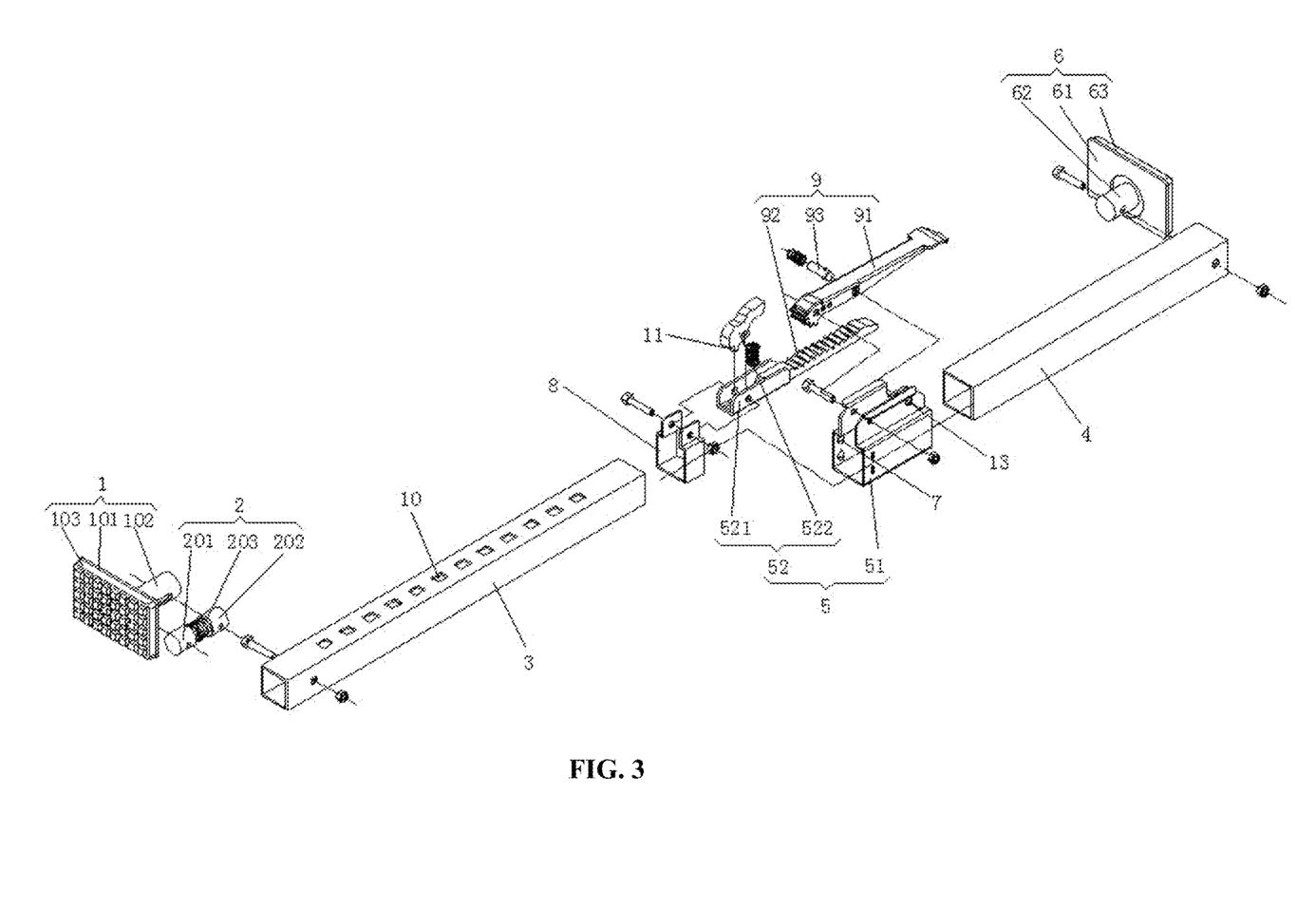
FIG. 3 is an explosive structural schematic diagram of a large-travel anti-loosening Cargo Bar capable of cloud monitoring provided by the present disclosure.
Figure 6:
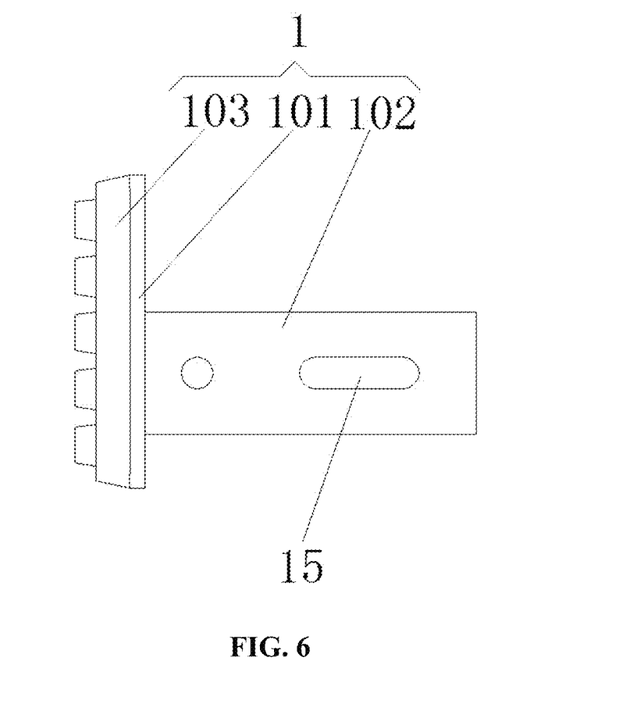
FIG. 6 is a structural schematic diagram of a first bearing assembly provided in the present disclosure.
Figure 7:
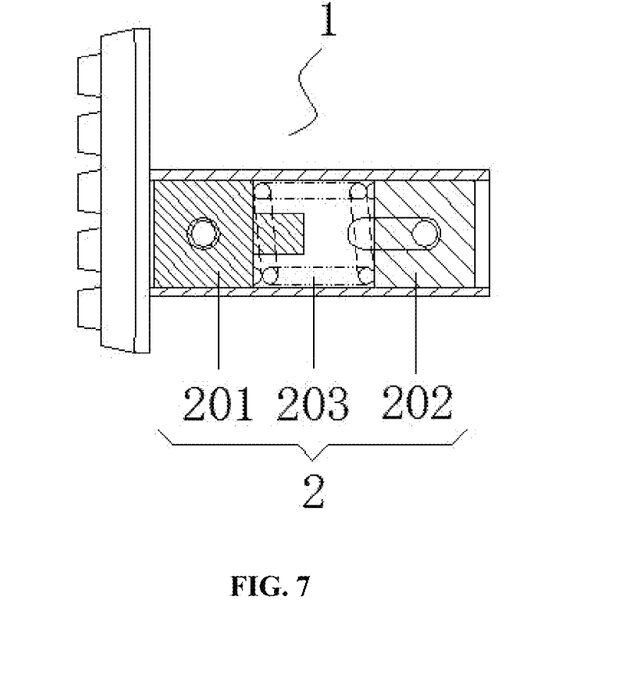
FIG. 7 is a structural schematic diagram of the contact state of a signal transmitter and an induction contact provided in the present disclosure.
Figure 8:
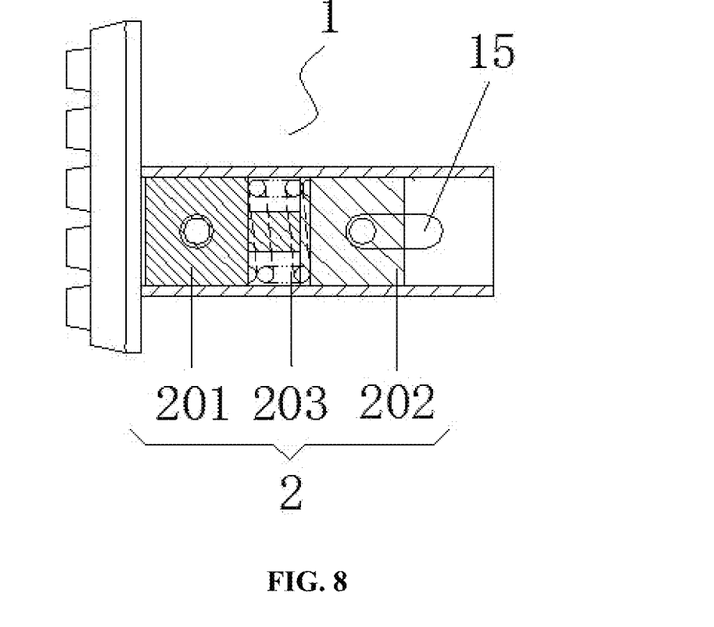
FIG. 8 is a structural schematic diagram of the separated state of a signal transmitter and an induction contact provided in the present disclosure.

Referring to FIG. 1 to FIG. 11, the embodiment of the present disclosure discloses a large-travel anti-loosening Cargo Bar capable of cloud monitoring, comprising:

a Cargo Bar main body;

a first bearing assembly 1, the first bearing assembly 1 being slidably connected with the Cargo Bar main body;

a trigger assembly 2, the trigger assembly 2 being arranged in the first bearing assembly 1, and the trigger assembly 2 comprising a signal transmitter 201, an induction contact 202 and an elastic piece 203;

the signal transmitter 201 being fixedly connected with the first bearing assembly 1;

the induction contact 202 being in sliding connection with the first bearing assembly 1 and being fixedly connected with the Cargo Bar main body; and the elastic piece 203 being located between the signal transmitter 201 and the induction contact 202, and the elastic piece 203 specifically being a reset spring;

wherein, when the Cargo Bar is in a working state, the signal transmitter 201 is in contact with the induction contact 202, the signal transmitter 201 is in communication connection with an external terminal, and the terminal is used for monitoring the working state of the Cargo Bar.

In the embodiment, specifically, a button cell is arranged inside the signal transmitter 201. The signal transmitter 201 is in wireless communication connection with the terminal used by a driver. The terminal can be a mobile terminal such as a mobile phone, a tablet computer and the like in a practical application process.

Preferably, when the signal emitter 201 is disconnected from the induction contact 202, the signal emitter 201 sends a trigger signal to the terminal. The terminal can generate an alarm signal according to the trigger signal sent by the signal emitter 201 and trigger early warning. In the actual application process, the driver can be reminded of the loosening phenomenon of the Cargo Bar through short messages or voice broadcast.

In the embodiment, the Cargo Bar main body comprises an inner pipe 3, an outer pipe 4, a connecting mechanism 5 and a second bearing assembly 6.

One end of the inner pipe 3 extends into the outer pipe 4, the inner pipe 3 is slidably connected with the outer pipe 4, the first bearing assembly 1 is slidably connected with the end, away from the outer pipe 4, of the inner pipe 3, the second bearing assembly 6 is fixedly connected with the end, away from the inner pipe 3, of the outer pipe 4, and the connecting mechanism 5 is used for connecting the inner pipe 3 and the outer pipe 4.

Wherein, in the using process, when the inner pipe 3 and the outer pipe 4 are adjusted to proper lengths according to needs, the positions of the inner pipe 3 and the outer pipe 4 are relatively fixed through the connecting mechanism 5. Preferably, the inner pipe 3 and the outer pipe 4 are each of a square pipe structure, and the inner pipe 3 can slide in a cavity of the outer pipe 4. Specifically, the Cargo Bar is applied to a container. When a cargo box is accommodated in the container, the cargo box needs to be supported in the container through the Cargo Bar, and then the cargo box is blocked. Therefore, the situation that when a vehicle transports cargos, due to uneven roads or sudden brakes in the transportation process, the cargo box is prone to rolling or vibrating, and great potential safety hazards exist in the transportation process is avoided. When the Cargo Bar is fixed in the container, the first bearing assembly 1 and the second bearing assembly 6 are respectively in contact with the inner wall of the container. Under the condition that the two ends of the Cargo Bar are stressed, the first bearing assembly 1 slides towards the direction of the inner pipe 3, so that the signal transmitter 201 is in contact with the induction contact 202, namely, the Cargo Bar is in a working state.

According to some embodiments of the present disclosure, the connecting mechanism 5 comprises a fixed support 51 and a clamping assembly 52.

Figure 11:
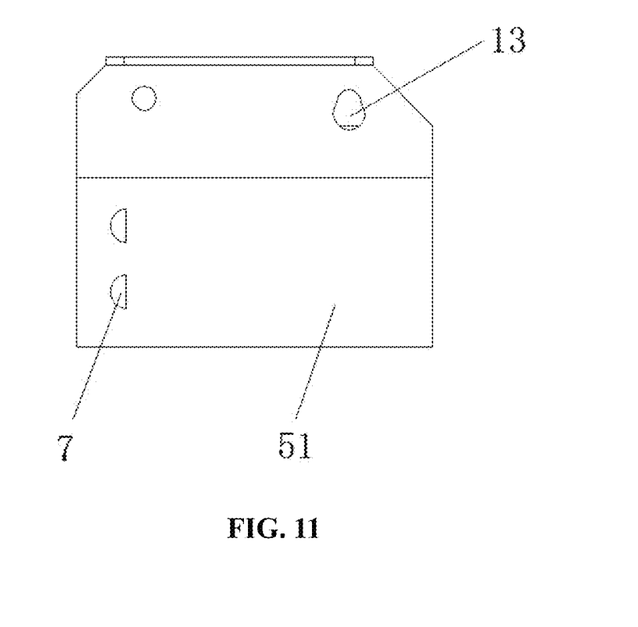
FIG. 11 is a structural schematic diagram of a fixed support provided in the present disclosure.

The fixed support 51 is fixedly connected with the end, away from the second bearing assembly 6, of the outer pipe 4. Specifically, a stop boss 7 is arranged on the inner wall of the fixed support 51 and used for axially limiting the end of the outer pipe 4. The fixed support 51 and the outer pipe 4 can be connected in a welding or riveting mode.

Figure 4:
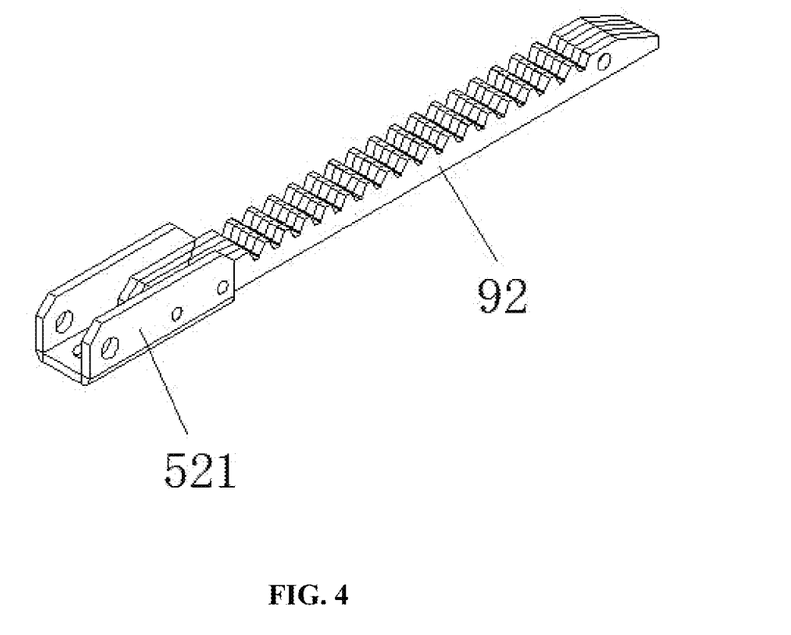
FIG. 4 is a connected structural schematic diagram of a supporting piece and a rack provided in the present disclosure.
Figure 10:
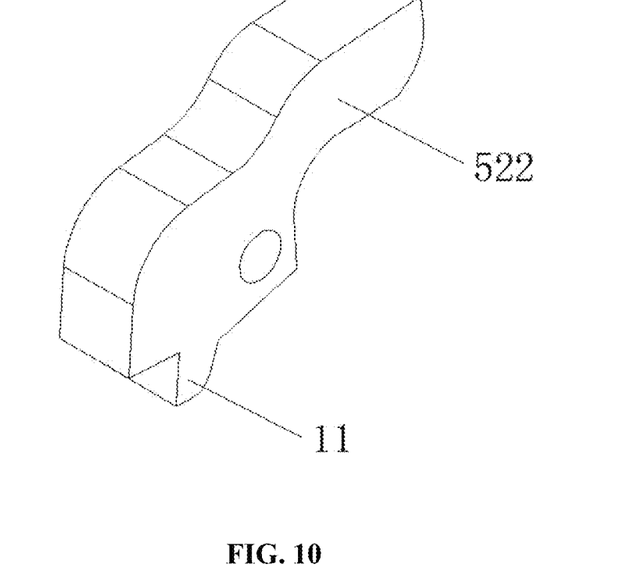
FIG. 10 is a structural schematic diagram of a clamping piece provided in the present disclosure.

The clamping assembly 52 comprises a supporting piece 521 and a clamping piece 522.

A fixed part 8 sleeves the inner pipe 3, and the inner pipe 3 is in clearance fit with the fixed part 8, so that the inner pipe 3 can slide in the fixed part 8. The fixed part 8 is connected with the supporting piece 521, and the supporting piece 521 is connected with the fixed support 51 through a locking assembly 9. Through the arrangement of the locking assembly 9, the fixed part 8 and the supporting piece 521 can be fixed outside the inner pipe 3, and the distance between the fixed support 51 and the fixed part 8 is guaranteed.

The clamping piece 522 is rotatably connected with the supporting piece 521, a plurality of spacing holes 10 are formed in the inner pipe 3 in the length direction of the inner pipe at intervals, and protrusions 11 matched with the spacing holes 10 are arranged on the clamping piece 522. The protrusions 11 on the clamping piece 522 are matched with the spacing holes 10 in different positions of the inner pipe 3, and then the length of the Cargo Bar is adjusted. Specifically, at the end, close to the fixed support 51, of the clamping piece 522, the clamping piece 522 and the supporting piece 521 are connected through a spring. Through the arrangement of the spring, the spring can apply an upward acting force to the clamping piece 522, so that the protrusion 11 on the other side of the clamping piece 522 can be smoothly clamped into the spacing hole 10 in the inner pipe 3 conveniently, an upward force is provided for the clamping piece 522, and the clamping firmness of the clamping piece 522 and the inner pipe 3 is guaranteed.

In the embodiment, preferably, the locking assembly 9 comprises a handle 91, a rack 92 and a lock pin 93.

Figure 5:
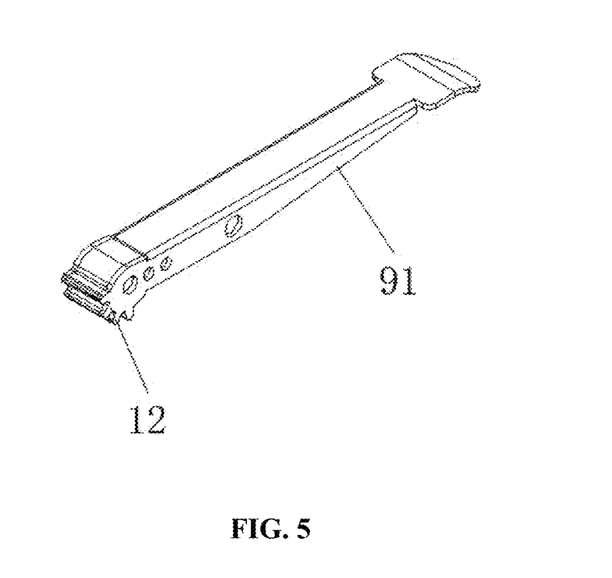
FIG. 5 is a structural schematic diagram of a handle provided in the present disclosure.

One end of the handle 91 is rotatably connected with the fixed support 51, and a ratchet wheel 12 is arranged at the end, connected with the fixed support 51, of the handle 91.

One end of the rack 92 is connected with the supporting piece 521, the other end of the rack 92 extends towards the direction of the outer pipe 4, and the rack 92 is matched with the ratchet wheel 12.

Figure 9:
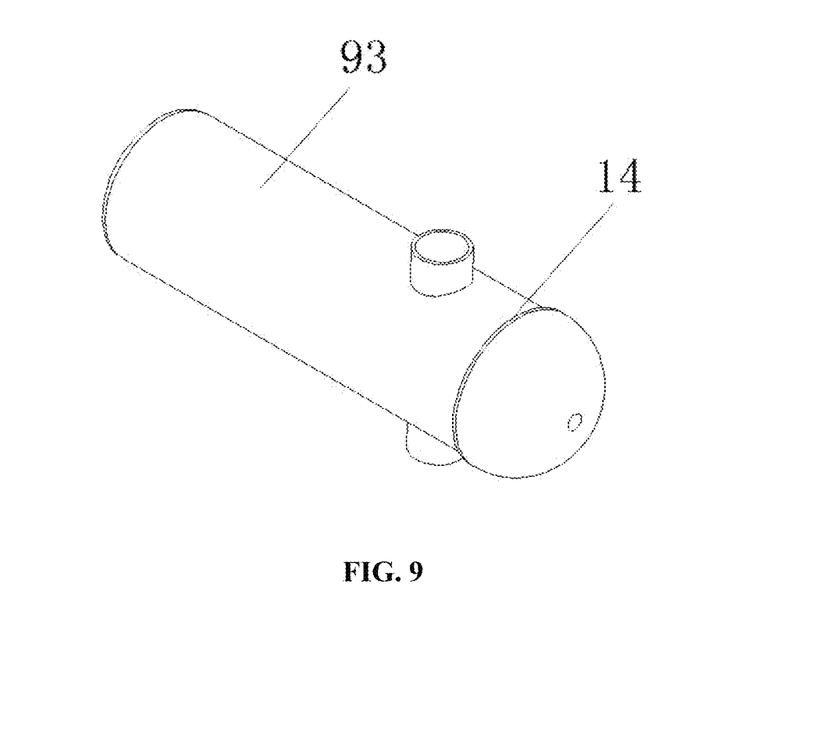
FIG. 9 is a structural schematic diagram of a lock pin provided in the present disclosure.

The lock pin 93 is arranged in the middle of the handle 91, and a pin hole 13 matched with the lock pin 93 is formed in the fixed support 51.

Wherein, when the lock pin 93 is clamped in the pin hole 13, the ratchet wheel 12 is meshed with the rack 92.

It can be understood that when the handle 91 faces the direction of the outer pipe 4, the ratchet wheel 12 at the end of the handle 91 is meshed with the rack 92, the lock pin 93 is clamped in the pin hole 13, and the protrusion 11 on the clamping piece 522 is clamped in the spacing hole 10 in the inner pipe 3. At the moment, the inner pipe 3 and the outer pipe 4 are in a locked state, and fixation of the relative positions of the inner pipe 3 and the outer pipe 4 is achieved. When the relative positions of the inner pipe 3 and the outer pipe 4 are adjusted, firstly, the lock pin 93 is pressed in from the pin hole 13, the handle 91 is rotated to be opened, the handle 91 is rotated to the clamping piece 522, the handle 91 is pressed downwards, and the clamping piece 522 rotates under the acting force of the handle 91. When the protrusion 11 on the clamping piece 522 is disengaged from the spacing hole 10 in the inner pipe 3, at the moment, the inner pipe 3 can slide along the outer pipe 4, and the length of the Cargo Bar can be adjusted.

Specifically, the rack 92 is formed by splicing a plurality of toothed iron sheets, and the ratchet wheel 12 at the end of the handle 91 is also formed by splicing a plurality of toothed iron sheets. The ratchet wheel 12 and the handle 91 are welded into an integrated structure. Meanwhile, the position, provided with the pin hole 13, of the top of the fixed support 51 is of an asymmetric structure. The side, opposite to the side provided with the pin hole 13, of the fixed support 51 is of a notch structure. When the handle 91 is in a locked state, one end of the lock pin 93 is clamped in the pin hole 13. When the handle 91 needs to be unlocked, the lock pin 93 can move towards the side, provided with the notch structure, of the fixed support 51, and rotation of the handle 91 can be achieved as long as the lock pin 93 slides out of the pin hole 13.

In the embodiment, preferably, the end, matched with the pin hole 13, of the lock pin 93 is provided with a limiting step 14, a spring sleeves the lock pin 93 located between the handle 91 and the limiting step 14, the pin hole 13 is of a pear-shaped structure, the lock pin 93 can pass through the lower portion of the pin hole 13, and the limiting step 14 can be connected to the upper portion of the pin hole 13 in a clamped mode. The pin hole 13 is arranged to be of a pear-shaped structure, so that the pin hole 13 is of a structure with a small upper portion and a large lower portion. In the adjusting process, the end, provided with the limiting step 14, of the lock pin 93 firstly passes through the lower portion of the pin hole 13. After the structure is adjusted, under the action of force, the handle 91 can rotate upwards by a certain angle, and then the limiting step 14 is clamped to the upper portion of the pin hole 13. At the moment, the Cargo Bar can be prevented from loosening.

In the embodiment, preferably, the first bearing assembly 1 comprises a first bearing plate 101, a first connecting pipe 102 and a first non-slip mat 103, one end of the first connecting pipe 102 is connected with the first bearing plate 101, a strip-shaped hole 15 is formed in the first connecting pipe 102, the other end of the first connecting pipe 102 is slidably connected with the inner pipe 3 through the strip-shaped hole 15, and the first non-slip mat 103 is arranged at the end, away from the first connecting pipe 102, of the first bearing plate 101.

Wherein, through holes are both formed in the induction contact 202 and the inner pipe 3, and the induction contact 202 is arranged in the first connecting pipe 102. A bolt sequentially passes through the through hole in the inner pipe 3, the strip-shaped hole 15 in the first connecting pipe 102 and the through hole in the induction contact 202. The induction contact 202, the first connecting pipe 102 and the inner pipe 3 are connected. The first connecting pipe 102 is in clearance fit with the inner pipe 3 and the induction contact 202 respectively, so that the bolt can move in the strip-shaped hole 15 under the stress action of the first bearing plate 101 in the first connecting pipe 102, namely, the first bearing assembly 1 can slide along the axial direction of the inner pipe 3. Meanwhile, the signal transmitter 201 is fixedly connected with the inner wall of the inner pipe 3 or abuts against the first bearing plate 101. Based on this, under the condition that the two ends of the Cargo Bar are stressed, the first bearing plate 101 drives the first connecting pipe 102 to move towards the direction of the inner pipe 3, so that the signal transmitter 201 is in contact with the induction contact 202. When the two ends of the Cargo Bar are loosened, under the action of the reset spring arranged between the signal transmitter 201 and the induction contact 202, the signal transmitter 201 moves towards the direction away from the inner pipe 3, so that the signal transmitter 201 is separated from the induction contact 202. The signal emitter 201 sends a trigger signal to the terminal. The terminal can generate an alarm signal according to the trigger signal sent by the signal emitter 201 and trigger early warning. In the actual application process, the driver can be reminded of the loosening phenomenon of the Cargo Bar through short messages or voice broadcast.

In the embodiment, the second bearing assembly 6 comprises a second bearing plate 61, a second connecting pipe 62 and a second non-slip mat 63, one end of the second connecting pipe 62 is fixedly connected with the second bearing plate 61, the other end of the second connecting pipe 62 is fixedly connected with the outer pipe 4, and the second non-slip mat 63 is arranged at the end, away from the second connecting pipe 62, of the second bearing plate 61. In other embodiments, the second bearing assembly 6 can be arranged to be the same as the first bearing component 1. The trigger assemblies 2 are arranged at the two ends of the Cargo Bar, so that the loosening phenomenon of the Cargo Bar can be monitored more accurately in the using process of the Cargo Bar. The first non-slip mat 103 and the second non-slip mat 63 are made of rubber materials. A plurality of protruding structures are arranged on the first non-slip mat 103 and the second non-slip mat 63, so that the friction force between the first non-slip mat 103 and the inner wall of the container and the friction force between the second non-slip mat 63 and the inner wall of the container are increased conveniently.

All embodiments in this specification are described in a progressive manner. Each embodiment focuses on differences from other embodiments. For the part that is the same or similar between different embodiments, reference may be made between the embodiments. The device disclosed in the embodiment corresponds to the method disclosed in the embodiment, and therefore the description is relatively brief. Related information refers to descriptions of the related parts in the method.

The embodiments disclosed above are described to enable a technical person skilled in the art to implement or use the present disclosure. Various modifications to the embodiments are obvious to those skilled in the art, and general principles defined in the present disclosure may be implemented in other embodiments without departing from the spirit or scope of the present disclosure. Therefore, the present disclosure will not be limited to the embodiments described in the present disclosure but extends to the widest scope that complies with the principles and novelty disclosed in the present disclosure.

What is claimed is:

1. A large-travel anti-loosening Cargo Bar capable of cloud monitoring, comprising:
   a Cargo Bar main body;
   a first bearing assembly, the first bearing assembly being slidably connected with the Cargo Bar main body;
   a trigger assembly, the trigger assembly being arranged in the first bearing assembly, and the trigger assembly comprising a signal transmitter, an induction contact and an elastic piece;
   the signal transmitter being fixedly connected with the first bearing assembly;
   the induction contact being in sliding connection with the first bearing assembly and being fixedly connected with the Cargo Bar main body; and
   the elastic piece being located between the signal transmitter and the induction contact;
   wherein, when the Cargo Bar is in a working state, the signal transmitter is in contact with the induction contact, the signal transmitter is in communication connection with an external terminal, and the terminal is used for monitoring the working state of the Cargo Bar;
   wherein the Cargo Bar main body comprises an inner pipe, an outer pipe, a connecting mechanism and a second bearing assembly; and
   one end of the inner pipe extends into the outer pipe, the inner pipe is slidably connected with the outer pipe, the first bearing assembly is slidably connected with the end, away from the outer pipe, of the inner pipe, the second bearing assembly is fixedly connected with the end, away from the inner pipe, of the outer pipe, and the connecting mechanism is used for connecting the inner pipe and the outer pipe;
   wherein the connecting mechanism comprises a fixed support and a clamping assembly, and the large-travel anti-loosening Cargo Bar capable of cloud monitoring further comprises a locking assembly;
   the fixed support is fixedly connected with the end, away from the second bearing assembly, of the outer pipe;
   the clamping assembly comprises a supporting piece and a clamping piece;
   the supporting piece is connected with the fixed support through the locking assembly; and
   the clamping piece is rotatably connected with the supporting piece, a plurality of spacing holes are formed in the inner pipe in the length direction of the inner pipe at intervals, and protrusions matched with the spacing holes are arranged on the clamping piece;
   wherein the locking assembly comprises a handle, a rack, and a lock pin;
   one end of the handle is rotatably connected with the fixed support, and a ratchet wheel is arranged at the end, connected with the fixed support, of the handle;

one end of the rack is connected with the supporting piece, the other end of the rack extends towards the direction of the outer pipe, and the rack is matched with the ratchet wheel; and the lock pin is arranged in the middle of the handle, and a pin hole matched with the lock pin is formed in the fixed support;

wherein, when the lock pin is clamped in the pin hole, the ratchet wheel is meshed with the rack;

wherein the end, matched with the pin hole, of the lock pin is provided with a limiting step, a spring sleeves the lock pin located between the handle and the limiting step, the pin hole is of a pear-shaped structure, the lock pin can pass through the lower portion of the pin hole, and the limiting step can be connected to the upper portion of the pin hole in a clamped mode.

2. The large-travel anti-loosening Cargo Bar capable of cloud monitoring according to claim 1, wherein a stop boss is arranged on the inner wall of the fixed support and used for axially limiting the end of the outer pipe.

3. The large-travel anti-loosening Cargo Bar capable of cloud monitoring according to claim 1, further comprising a fixed part, the fixed part sleeves the inner pipe, and the fixed part is connected with the supporting piece.

4. The large-travel anti-loosening Cargo Bar capable of cloud monitoring according to claim 1, wherein the first bearing assembly comprises a first bearing plate, a first connecting pipe and a first non-slip mat, one end of the first connecting pipe is connected with the first bearing plate, a strip-shaped hole is formed in the first connecting pipe, the other end of the first connecting pipe is slidably connected with the inner pipe through the strip-shaped hole, and the first non-slip mat is arranged at the end, away from the first connecting pipe, of the first bearing plate.

5. The large-travel anti-loosening Cargo Bar capable of cloud monitoring according to claim 1, wherein the second bearing assembly comprises a second bearing plate, a second connecting pipe and a second non-slip mat, one end of the second connecting pipe is fixedly connected with the second bearing plate, the other end of the second connecting pipe is fixedly connected with the outer pipe, and the second non-slip mat is arranged at the end, away from the second connecting pipe, of the second bearing plate.

6. The large-travel anti-loosening Cargo Bar capable of cloud monitoring according to claim 1, wherein the elastic piece is a reset spring.

* * * * *